United States Patent [19]

Collins

[11] Patent Number: 4,667,842
[45] Date of Patent: May 26, 1987

[54] END COMPONENT AND SIDE WALL FOR A CONTAINER

[75] Inventor: Malcolm G. Collins, Oxfordshire, England

[73] Assignee: Metal Box plc, United Kingdom

[21] Appl. No.: 854,562

[22] Filed: Apr. 22, 1986

[30] Foreign Application Priority Data

Apr. 29, 1985 [GB] United Kingdom ................. 8510817

[51] Int. Cl.⁴ ............................................. B65D 39/00
[52] U.S. Cl. ..................................... 220/307; 220/74; 220/359
[58] Field of Search ............... 220/354, 355, 356, 307, 220/74, 359

[56] References Cited

U.S. PATENT DOCUMENTS 3,995,763  12/1976  Ayres et al. .......................... 220/224
4,228,916  10/1980  Weingardt ........................... 220/354
4,530,442   7/1985  Vogel, Jr. et al. .................. 220/354

Primary Examiner—George T. Hall
Attorney, Agent, or Firm—Diller, Ramik & Wight

[57] ABSTRACT

An end component for a spin welded container comprises a plug which is received within the container side wall for spin-welding thereto. An annular bead co-operates with a step on the wall to locate the plug. During welding, flash generated at the main weld area below the bead is prevented from escaping upwardly by the bead. A cavity is provided above the bead to retain any material which passes the bead or is formed by melting of the bead.

16 Claims, 7 Drawing Figures

END COMPONENT AND SIDE WALL FOR A CONTAINER

BACKGROUND OF THE INVENTION

1. Field of the Invention

The invention relates to an end component and a cylindrical side wall for a container which are intended to be welded together by a spin-welding process and to a method of making a container therefrom.

The invention particularly relates to a construction of these articles which is designed to ensure correct assembly of the container prior to and during the spin-welding process, and to avoid any unsightly "flash" formed during welding occuring on the visible surfaces of the container. "Flash" is a term known in the art, and refers to weld material which spreads out from the weld area.

2. Description of the Prior Art

In a known method of spin-welding, an end component is provided with a cylindrical portion which is fitted into the open end of the cylindrical side wall of a container and a weld is formed at the interface between the internal surface of the container and the external surface of the cylindrical portion of the end component. Where the weld interface extends to the outside of the welded article there is a substantial risk of flash escaping to the outside of the article and solidifying on the visible outer surfaces thereof.

SUMMARY OF THE INVENTION

According to the invention there is provided an end component and a cylindrical side wall for a container, adapted to be joined together by spin welding, wherein the side wall comprises a first cylindrical portion at the open end thereof which has a reduced thickness relative to an adjacent second cylindrical portion of the side wall and is joined thereto by one or more annular steps in the interior surface of the side wall, wherein the end component comprises a plug adapted to fit into the open end of the side wall having a first outer cylindrical surface adapted to engage the second cylindrical portion of the side wall, an outwardly extending annular step adapted to engage in its entirety the first annular step on the side wall immediately above the second cylindrical portion of the side wall, a second outer cylindrical surface adjacent the outwardly extending annular step on the opposite side thereof from the first outer cylindrical surface and adapted to engage the interior surface of the side wall immediately above the first annular step on the side wall, and a first radial flange adapted to overlie the end face of the side wall, and wherein an annular cavity is formed between the plug and the reduced first cylindrical portion of the side wall when the end component and the side wall are assembled.

Correct location of the end component within the container wall is achieved by the provision of the annular step on the plug co-operating with the corresponding step on the side wall. The main weld area is located below a barrier formed by the annular step and adjacent contacting surfaces. This barrier acts to impede flash from the weld passing upwardly of the container. Any flash which is forced past the barrier, and any flash formed by welding at the barrier is contained in the cavity formed between the container wall and the end component above the step.

The invention is particularly useful in connection with articles made from polymers such as polypropylene which have low viscosity when melted and exhibit laminar flow characteristics under the high melt shear rate conditions experienced at the weld interface during spin-welding. We believe nylon (polyamide) would behave in a similar manner. The articles may, however, be made of other polymers such as Polyethylene Terephthalate (PET), high density Polyethylene (HDPE), and low density polyethylene (LDPE).

DETAILED DESCRIPTION OF THE INVENTION

Figure 1:
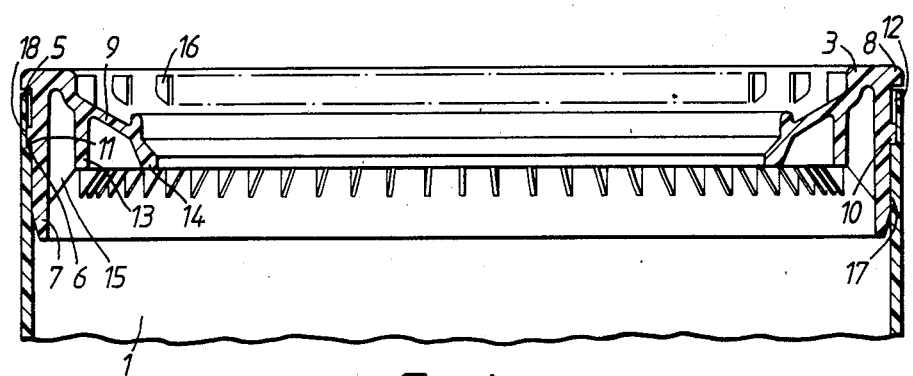
FIG. 1 is a partial vertical section through an assembled container prior to spin-welding.

In the drawings, the same reference numerals are used in each Figure to refer to common elements.

Figure 2:
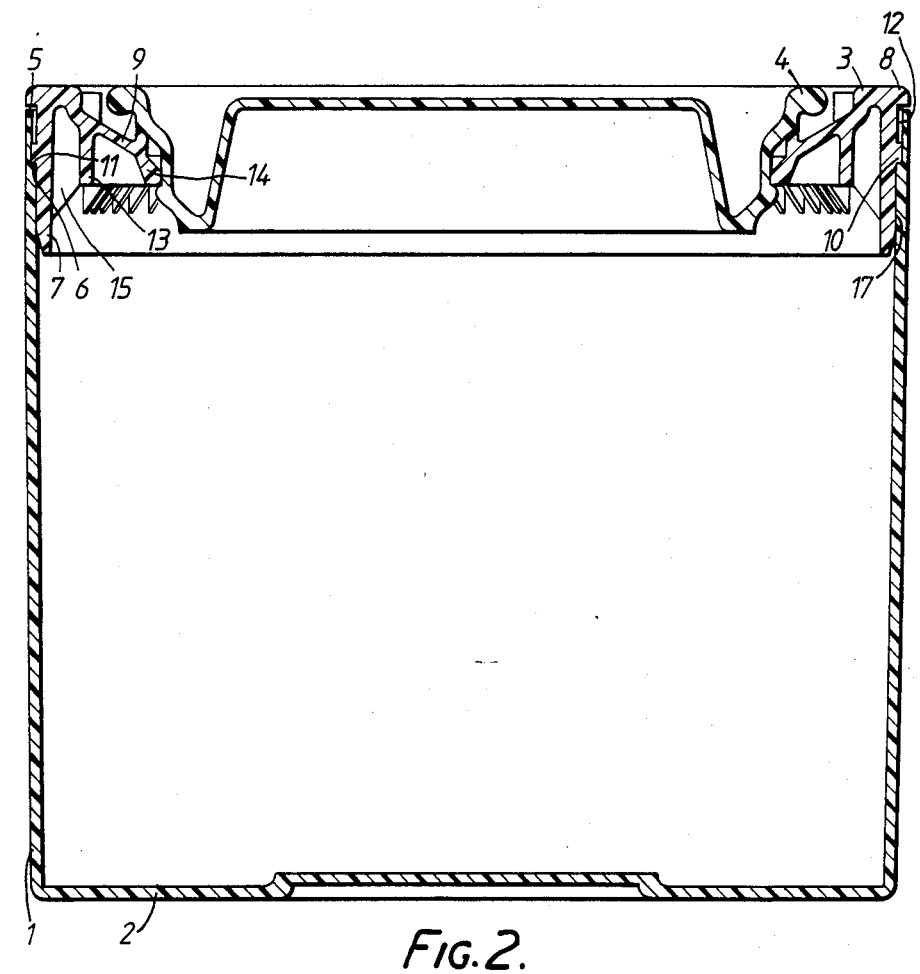
FIG. 2 is a vertical section of the container of FIG. 1 after spin-welding.

Referring to FIGS. 1 and 2 it will be seen that the body of the container comprises a cylindrical side wall 1 and a closed lower end wall 2. The upper end component of the container comprises a plug 3 and a closure member 4 which is nested in a circular opening in the plug.

At its open end, the side wall 1 is provided with a portion 5 which is of reduced thickness relative to the rest of the wall and is joined to the rest of the wall by an annular step 6.

The plug 3 comprises a substantially cylindrical wall 7, a first radial flange 8, and a second radial flange 9. An annular bead 10 formed on the outer surface of the plug wall 7 defines an annular step by means of its lower annular surface 11 which abuts the step 6 when the container is assembled. The cylindrical surface 18 of the bead 10 contacts the reduced wall portion 5. Above the bead, an annular cavity 12 is provided between the reduced wall portion 5 and the plug wall 7. The radial flange 8 overlies the end face of side wall 1 and is spaced therefrom prior to spin welding by a small gap of the order of 0.5 mm so that no welding occurs between the flange 8 and the wall although this gap is reduced in magnitude during the welding process by virtue of the partial melting of bead 10 and step 6 where they abut due to the axial force applied to the end component during welding. The second radial flange 9 is connected to the wall 7 at a root portion and is bifurcated to form two limbs 13 and 14. Limb 13 is connected to the wall 7 via a plurality of radial webs 15 which add rigidity to the structure. The limb 14 is shaped to receive and retain the closure member 4. A plurality of ribs 16 may be provided on the outer surface of the plug to enable the plug to be driven in rotation relative to the container.

The main weld area is provided by the interface formed between an outer cylindrical surface 17 on the wall 7 and the internal surface of the side wall 1. Further welding may also occur at the interface between the outer cylindrical surface 18 of the bead 10 and the internal surface of the reduced portion 5 of the wall 1, and between the abutting annular steps 6 and 11.

Figure 3:
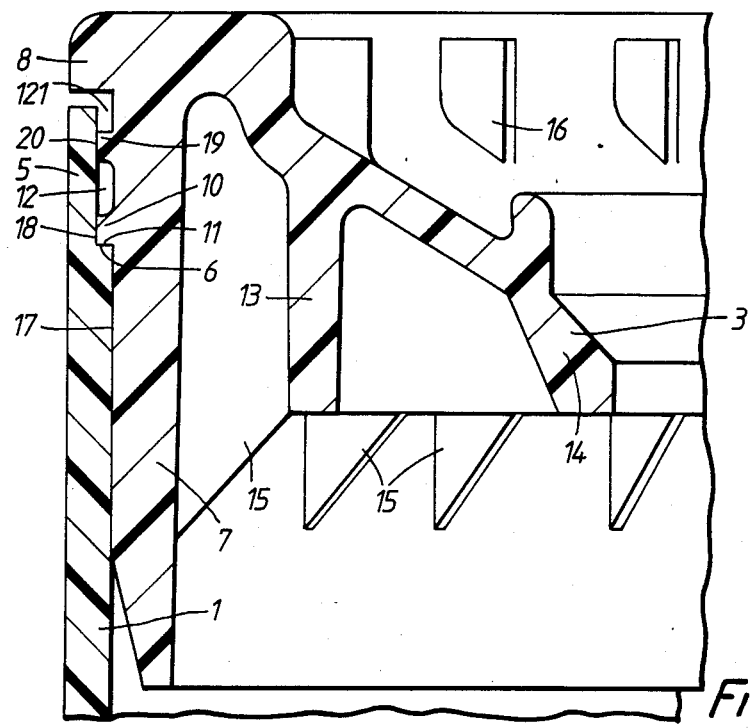
FIG. 3 is a partial vertical section through another embodiment of an assembled container.

In the embodiment shown in FIG. 3 the plug is provided with a second annular bead 19 having an outer cylindrical surface 20 dimensioned to engage the reduced portion 5 of the side wall 1. The surface 20 does not normally become welded to the side wall due to expulsion of air from the cavity 12 as a result of its thermal expansion and of its replacement by hot melt material (flash) from the annular bead 10. An additional flash trap cavity 121 is provided above the bead 19 to accommodate any melt which may be formed as a result of contact between the bead 19 and the wall portion 5.

Figure 4:
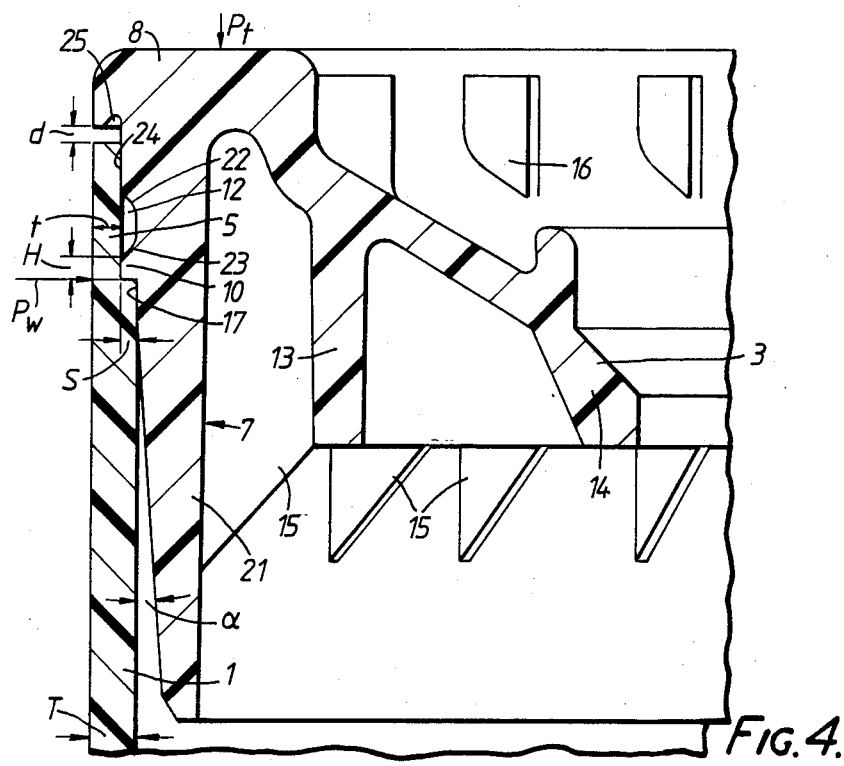
FIG. 4 is a partial vertical section through another embodiment of an assembled container.

In the embodiment of FIG. 4, a plug is shown having a wall 7 which is gradually reduced in thickness away from the main weld area to provide a tapered conical portion 21. The taper angle is preferably about 4°. Such a taper may of course be provided on any of the other embodiments described. The cavity 12 in this instance is shown having inclined walls 22 and 23 for reasons connected with the injection moulding of the plug component. These walls might equally be perpendicular to the axis of the container. Above the cavity, the wall 7 of the plug has an outer cylindrical surface 24 dimensioned to engage the side wall portion 5. A recess 25 in the underside of the flange 8 forms a further cavity to retain any melt generated at surface 24. Various dimensions and co-operating forces which assist in providing a rapid flash-free fusion of the plug to the container are also identified on FIG. 4.

Figure 5:
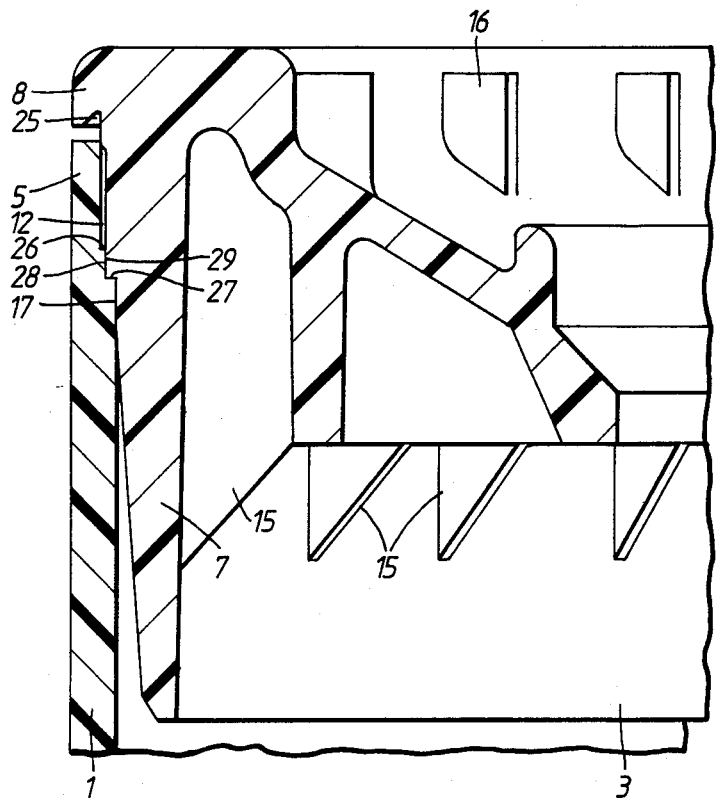
FIG. 5 is a partial vertical section through another embodiment of an assembled container.
Figure 6:
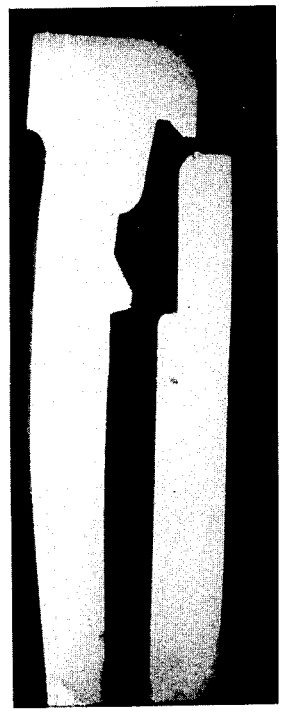
FIG. 6 is a reproduced photograph of microtomed section of experimental components for a container before spin welding.

A further modification is shown in FIG. 5 where the reduced portion 5 of the side wall is joined to the rest of the side wall by two annular steps 26,27 and the plug has an outer cylindrical surface 28 which is dimensioned to engage the internal surface 29 of the side wall defined between the steps 26,27.

It will be understood that individual features of the embodiments shown in any of FIGS. 1-5 may be appropriately applied to any of the other embodiments.

The main purpose of the horizontal and vertical faces 11,18 of the lower abutment bead 10 is to contact corresponding surfaces on the side wall (at the step) and in co-operation with the applied forces "Pt" and "Pw", to form an effective barrier to the upward flow of liquid melt formed in the area of the functional weld during the spin-welding process. "Pt" is the axial load applied between the assembled end component and container wall during the welding process, and "Pw" is the hoop pressure applied radially on the outside of the main weld area.

During the spin-welding of the end component to the side wall, the functional weld is formed initially between the surface 17 and the side wall 1, and then extends progressively down the taper of the wall 7 depending on the duration of the spin weld. The taper has been found to be most advantageous in that it contributes to easy assembly and during welding offers a low pressure escape route for melt formed at the functional weld, thereby relieving to a degree the force exerted by this melt on the barrier characteristics of the abutment bead 10. It also effectively hides any extraneous melt splashed downwards and remote from the functional weld.

Both faces 18,11 of the lower abutment bead 10 normally remain fused to their associated side wall surfaces and contribute to the overall strength of the spin-weld.

This method of spin-welding an end component to the cylindrical side wall of a container without the formation of aesthetically unattractive flash is particularly suited to the attachment technique wherein the end component is fully assembled into the container as shown in FIG. 1, FIG. 3 and FIG. 4 prior to the end component being spun to generate the heat of fusion necessary to create melt and, hence, the weld. However, such end components could also be successfully assembled and welded using an inertia technique wherein the end component is separately spun up to a predetermined speed on a low inertia chuck which is then disengaged from the drive mechanism and directed such that the spinning end component rapidly assumes the assembled position shown in FIGS. 1, 3 and 4 before expending its inertial energy to create the weld structure shown in FIG. 2 and more particularly in FIG. 7.

In the technique wherein preassembled end components are subsequently spun relative to the container side wall, where such component and container wall have been injection moulded from thermoplastic polymers such as polypropylene and polyethylene, the preferred relative peripheral speed has been found to be in the region of 8 to 12 meters per second and the preferred duration of time at this speed between 0.11 and 0.4 seconds to achieve an adequate functional weld. Using a low inertia servo-motor, acceleration and braking might comprise up to 0.1 seconds of these total duration times. However, these times are, of course, dependent on the radially compressive load, "Pw", applied to the junction between the end component and the side wall, the greater the load the less the time of relative motion required to effect an adequately fused weld.

An interference fit between the end component and the side wall is necessay to enable frictional heat to generate polymer melt for welding, and because the end component is a plug-fit in the circular container, the force between the two fusing surfaces increases as a function of this interference. For aesthetic reasons it is preferable to minimise the interference but it has been found that a diametric interference minimum of 0.05 mm on a container diameter of 158 mm is appropriate to form an integral fused weld of a few millimeters length. That is to say that the diameter of the plug at the surface 17 should be at least 0.05 mm greater than the internal diameter of the wall 1 prior to assembly. Also at this minimum interference, where the inter-component load may be about 0.006 N/mm$^2$ on a typical 2.5 liter polypropylene container the weld integrity benefits from the use of an outer compressive ring of an appropriate nature which increases this inter-component load to a preferred value of between 0.10 N/mm$^2$ and 0.30 N/mm$^2$.

The required value of the radially applied pressure, "Pw", depends largely on the interference fit between end component and the side wall and on the rigidity or compressibility of the inserted end component and, depending on the design of this component, is typically between 0.05 and 0.30 N/mm$^2$.

The performance (prevention of the escape of flash from the main weld) of the vertical face 18 of the lower abutment bead 10 at the minimum interference of 0.05 mm also benefits from such an increase in the inter-component load brought about through use of an outer compressive ring applying the radial pressure Pw.

Because of the production tolerances on moulded plastics articles of this diameter and the need to have a minimum interference of 0.05 mm, a situation can arise where a "small" container wall and "large" end component combine to give an interference of up to 1.25 mm on diameter. The motor drive has to be sized to cope with the increased torque resulting from such an interference on a pot of 158 mm diameter, for example.

The lower horizontal face 11 of the abutment bead and the corresponding internal step 6 on the inner wall of the container are dimensioned to provide an initial clearance between the top of the container wall and the flange 8 of the inserted end component. This clearance is critically important since although it will decrease during the partial downward erosion of the abutment bead during the spin-weld process, it must not be eliminated completely because contact would result in aesthetically unattractive and unacceptable flash appearing on the outside of the container.

It has been found that this clearance may be between 0.25 and 0.5 mm depending on the top load "Pt" applied, "Pw", and the polymer characteristics. It has also been found that for an injection moulded 2.5 liter polypropylene container of given dimensions that a "Pt" value of between 30 and 150 Newtons enables the horizontal, anti-flash face of the abutment bead to work most effectively without melting away so much of the bead that its anti-flash performance is lost.

The above described examples are particularly beneficial in achieving excellent, flash-free, spin-welded paint cans. In this case the side wall of the can and the closure member 4 may be made of plastics such as polypropylene or may be made of metal having a plastics coating applied thereto. The plug 3 of the end component will suitably be made of polypropylene.

Some dimensions suitable for the spin welding of a 2.5 liter polypropylene paint can are shown below.

Figure 7:
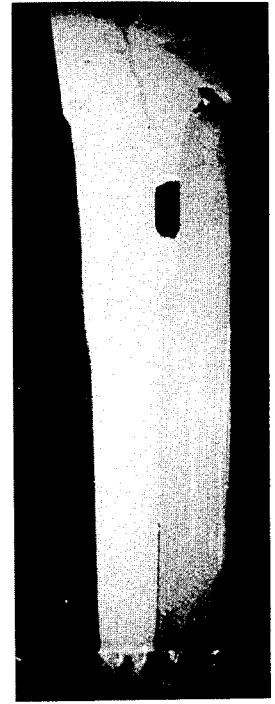
FIG. 7 is a reproduced photograph of a microtomed section of experimental components for a container after spin welding.

T=1.4 mm
t=1.0 mm
S=0.4 mm
H=0.5 mm
d=0.25 to 0.5 mm
Pt=30 to 150 N
Pw=0.05 to 0.30 N/mm$^2$
Diameter of Container=158 mm
Height of Container=161 mm It can be seen from FIG. 7 that a fused functional weld of about 4 mm length has been formed between the plug and the side wall; that the lower abutment bead has effectively prevented the upward flow of melt from the functional weld; that the central flash-trap cavity has accommodated a little melt arising from the abutment bead itself; that the upper flash-trap cavity in the flange of the plug has accommodated melt formed as a result of contact between the reduced portion of the side wall and an upper cylindrical surface of the plug; and that a finite separation has been maintained between the flange and the end face of the side wall.

I claim:

1. An end component and a cylindrical side wall for a container, adapted to be joined together by spin welding, wherein the side wall comprises a first cylindrical portion at the open end thereof which has a reduced thickness relative to an adjacent second cylindrical portion of the side wall and is joined thereto by one or more annular steps in the interior surface of the side wall, wherein the end component comprises a plug adapted to fit into the open end of the side wall having a first outer cylindrical surface adapted to engage the second cylindrical portion of the side wall, an outwardly extending annular step adapted to engage in its entirety the first annular step on the side wall immediately above the second cylindrical portion of the side wall, a second outer cylindrical surface adjacent the outwardly extending annular step on the opposite side thereof from the first outer cylindrical surface and adapted to engage the interior surface of the side wall immediately above the first annular step on the side wall, and a first radial flange adapted to overlie the end face of the side wall, and wherein an annular cavity is formed between the plug and the reduced first cylindrical portion of the side wall when the end component and the side wall are assembled.

2. An end component and cylindrical side wall for a container as claimed in claim 1, wherein the outwardly extending annular step on the plug and the second outer cylindrical surface on the plug are provided by a first outwardly extending annular bead formed on the plug.

3. An end component and cylindrical side wall for a container as claimed in claim 2, wherein the cavity is formed in the region between the first annular bead and the first radial flange.

4. An end component and cylindrical side wall for a container as claimed in claim 3, wherein a second annular bead is provided on the plug between the first annular bead and the first radial flange and wherein said second annular bead has an outer cylindrical surface adapted to engage the first cylindrical portion of the side wall.

5. An end component and cylindrical side wall for a container as claimed in claim 1, wherein the plug has a third outer cylindrical surface adjacent the first radial flange and adapted to engage the first cylindrical portion of the side wall.

6. An end component and cylindrical side wall for a container as claimed in claim 1, wherein the plug has a tapered conical portion adjacent the first outer cylindrical surface thereon and extending in the direction away from the open end of the side wall.

7. An end component and cylindrical side wall for a container as claimed in claim 6, wherein the taper angle of the conical portion is about 4°.

8. An end component and cylindrical side wall for a container as claimed in claim 1, wherein the plug comprises a second radial flange directed generally inwardly and defining a circular opening in the plug.

9. An end component and cylindrical side wall for a container as claimed in claim 8, wherein the end component further comprises a circular closure member adapted to engage and be held by the second radial flange and to thereby close the opening in the plug.

10. An end component and cylindrical side wall for a container as claimed in claim 8, wherein the second radial flange is connected to the rest of the plug at a root thereof and by means of a plurality of radial webs.

11. An end component and cylindrical side wall for a container as claimed in claim 1, wherein the first radial flange overlies the end face of the side wall with clearance when the end component and the side wall are assembled prior to the spin welding operation.

12. An end component and cylindrical side wall for a container as claimed in claim 1, wherein the first radial flange is provided with a recess in its underside which forms a further cavity for retention of melt material.

13. An end component and cylindrical side wall for a container as claimed in claim 1, wherein the end component and the side wall are made of polypropylene.

14. A method of making a container from an end component and a cylindrical side wall for a container according to claim 1 comprising the steps of
   (a) assembling the plug in the cylindrical side wall of the container so that the annular step on the plug engages a corresponding one of the annular steps on the side wall;
   (b) applying an axial load between the plug and the cylindrical side wall;
   (c) applying a radial hoop pressure to the side wall of the container in the region of the plug and
   (d) spinning the plug within the side wall of the container whilst maintaining the axial load and radial pressure of (b) and (c) above until a weld is formed between the first outer cylindrical surface of the plug and the second cylindrical portion of the side wall of the container.

15. A method according to claim 14, wherein the axial load applied is 30–150 Newtons.

16. A method according to claim 14, wherein the radial pressure applied is between 0.05 to 0.30 Newtons/mm$^2$.

* * * * *